US012567729B2

(12) United States Patent
Huang et al.

(10) Patent No.: US 12,567,729 B2
(45) Date of Patent: Mar. 3, 2026

(54) COMPOSITE CROSSARM AND POWER TRANSMISSION TOWER

(71) Applicant: JIANGSU SHEMAR ELECTRIC CO., LTD., Nantong (CN)

(72) Inventors: Qing Huang, Nantong (CN); Yanan Gu, Nantong (CN); Wenjie Wang, Nantong (CN); Jie Yu, Nantong (CN)

(73) Assignee: JIANGSU SHEMAR ELECTRIC CO., LTD., Nantong (CN)

( * ) Notice: Subject to any disclaimer, the term of this patent is extended or adjusted under 35 U.S.C. 154(b) by 240 days.

(21) Appl. No.: 18/288,962

(22) PCT Filed: Jun. 29, 2023

(86) PCT No.: PCT/CN2023/103620
§ 371 (c)(1),
(2) Date: Oct. 30, 2023

(87) PCT Pub. No.: WO2024/007931
PCT Pub. Date: Jan. 11, 2024

(65) Prior Publication Data
US 2025/0079819 A1 Mar. 6, 2025

(30) Foreign Application Priority Data
Jul. 6, 2022 (CN) .......................... 202210788989.1

(51) Int. Cl.
H02G 7/20 (2006.01)

(52) U.S. Cl.
CPC ..................................... H02G 7/20 (2013.01)

(58) Field of Classification Search
CPC ... H02G 7/20; H02G 7/05; H02G 9/06; H01B 17/38; H01B 17/46; H01B 17/48; E04H 12/24; E04H 12/00
(Continued)

(56) References Cited

U.S. PATENT DOCUMENTS 8,573,562 B2 * 11/2013 Devine .................... H02G 1/02
174/40 R
8,895,861 B2 * 11/2014 Cotton ................... H02G 7/053
174/45 R
(Continued)

FOREIGN PATENT DOCUMENTS

CN 201478017 U 5/2010
CN 101763922 A 6/2010
(Continued)

OTHER PUBLICATIONS

Chinese Patent Office, First Search Report issued in corresponding Application No. 2022107889891, dated Jul. 6, 2023, 1 pp.
(Continued)

*Primary Examiner* — Angel R Estrada
(74) *Attorney, Agent, or Firm* — Taft, Stettinius & Hollister LLP

(57) ABSTRACT

The present disclosure discloses a composite crossarm and a power transmission tower. The composite crossarm includes at least one insulator (1100) and at least one arcing device (1200) connected to the insulator (1100). Each of the at least one arcing device (1200) includes a high-voltage end arcing component (1210) and a low-voltage end arcing component (1220). The high-voltage end arcing component (1210) is connected to a high-voltage end of the insulator (1100), and the low-voltage end arcing component (1220) is connected to a low-voltage end of the insulator (1100). The at least one arcing device (1200) includes a first arcing device having an electrical clearance between the high-voltage end arcing component (1210) and the low-voltage end arcing component (1220) less than an electrical clearance between the high-voltage end and the low-voltage end of any one of the at least one insulator (1100). The composite crossarm disclosed by the present disclosure protects all
(Continued)

1000 insulators (1100) through the first arcing device to reduce the safety hazards.

17 Claims, 14 Drawing Sheets

(58) Field of Classification Search
USPC ........ 174/45 R, 158 R, 40 R, 41–44, 45 TD; 248/200, 205.1; 52/651.02, 651.03, 40, 52/697
See application file for complete search history.

(56) References Cited

U.S. PATENT DOCUMENTS

| | | | | |
|---|---|---|---|---|
| 11,551,835 | B2 * | 1/2023 | Lindsey | H01B 17/04 |
| 11,799,278 | B1 * | 10/2023 | Givens | H02G 7/20 |
| 12,104,395 | B2 * | 10/2024 | Ma | H02G 7/12 |
| 2021/0180358 | A1 | 6/2021 | Ma et al. | |

FOREIGN PATENT DOCUMENTS

| | | | |
|---|---|---|---|
| CN | 201829901 | U | 5/2011 |
| CN | 205384912 | U | 7/2016 |
| CN | 206991859 | U | 2/2018 |
| CN | 212062042 | U | 12/2020 |
| CN | 212303232 | U | 1/2021 |
| CN | 212907252 | U | 4/2021 |
| CN | 112878785 | A | 6/2021 |
| CN | 214175784 | U | 9/2021 |
| CN | 115110832 | A | 9/2022 |
| CN | 218069483 | U | 12/2022 |
| CN | 218069485 | U | 12/2022 |
| JP | H06162852 | A | 6/1994 |
| JP | H09171732 | A | 6/1997 |
| JP | 2005187755 | A | 7/2005 |
| JP | 3965152 | B2 | 8/2007 |
| KR | 101928783 | B1 | 12/2018 |

OTHER PUBLICATIONS

Chinese Patent Office, Supplementary Search Report issued in corresponding Application No. 2022107889891, dated Mar. 8, 2024, 2 pp.

European Patent Office, Extended Search Report issued in corresponding Application No. 23797628.7, dated Feb. 11, 2025, 10 pp.

International Search Report for corresponding Application No. PCT/CN2023/103620 dated Sep. 26, 2023, 4 pages.

Written Opinion for corresponding Application No. PCT/CN2023/103620 dated Sep. 26, 2023, 5 pages.

PCT International Searching Authority for corresponding Application No. PCT/CN2023/103620 dated Sep. 26, 2023, 1 page.

Chinese Office Action for corresponding Application No. 202210788989.1 dated Jul. 6, 2023, 8 pages.

Canadian Patent Office, Examination Report issued in corresponding Application No. 3,216,620, dated Dec. 18, 2025, 5 pp.

* cited by examiner

1000

12211

12211

12211     1222

1221

1320

1310

1301

1302

1301

1401     1420

1403

1410

1402

1401

2220

2400

2100

2520

3000

3100
(3120)

3100
(3120)

3100
(3110)

3100
(3120)

3210     3220

3200

COMPOSITE CROSSARM AND POWER TRANSMISSION TOWER

CROSS REFERENCE TO RELATED APPLICATIONS

This is a U.S. National Stage application of, and claims priority to, PCT/CN2023/103620, filed Jun. 29, 2023, which further claims priority to Chinese Patent Application No. 202210788989.1, filed Jul. 6, 2022, the disclosures of which are incorporated herein by reference in their entirety.

TECHNICAL FIELD

The present disclosure relates to the technical field of power transmission, and in particular, to a composite crossarm and a power transmission tower.

BACKGROUND

In the related art, the composite crossarm with a level above 220 kV is prone to overvoltage during operation. A grading ring mounted on the conventional composite crossarm can only play a role in equalizing the electric field. When an overvoltage (such as lightning strike) occurs, heavy current can instantly flow from fittings at a high-voltage end of an insulator to fittings at a low-voltage end of the insulator, which will burn the insulator, damage the fittings, cause the insulator to fall out, and cause potential safety hazards in the line.

SUMMARY

Accordingly, it is necessary to provide a composite crossarm and a power transmission tower, which are capable of protecting all insulators through a first arcing device and reducing potential safety hazards, to address problems that when an overvoltage (such as a lightning strike) occurs, a heavy current may instantly flow from a fitting at a high-voltage end of an insulator to a fitting at a low-voltage end of the insulator, which will burn the insulator, damage the fittings, cause the insulator to fall out, and cause potential safety hazards in the line.

The present disclosure provides a composite crossarm, which includes at least one insulator and at least one arcing device connected to the insulator. Each of the at least one arcing device includes a high-voltage end arcing component and a low-voltage end arcing component. The high-voltage end arcing component is connected to a high-voltage end of the insulator, and the low-voltage end arcing component is connected to a low-voltage end of the insulator. The at least one arcing device includes a first arcing device having an electrical clearance between the high-voltage end arcing component and the low-voltage end arcing component less than an electrical clearance between the high-voltage end and the low-voltage end of any one of the at least one insulator.

In the technical solution of the present disclosure, the electrical clearance between the high-voltage end arcing component and the low-voltage end arcing component of the first arcing device of the composite crossarm is less than the electrical clearance between the high-voltage end and the low-voltage end of any one of the at least one insulator, so that in the case of overvoltage, the discharge clearance between the high-voltage end arcing component and the low-voltage end arcing component of the first arcing device is first to be broken down, which can prevent the burning of the insulator due to the heavy current flowing from the high-voltage end to the low-voltage end of any insulator, thereby protecting all the insulators and reducing potential safety hazards.

In an embodiment, an insulator with a shed of a shortest length in the at least one insulator is connected with the first arcing device.

The above arrangement ensures that the electrical clearance between the high-voltage end and the low-voltage end of the arcing device connected to a first insulator of the insulators is less than the electrical clearance between the high-voltage end and the low-voltage end of each insulator, as long as the electrical clearance between the high-voltage end and the low-voltage end of the arcing device connected to the first insulator is less than the electrical clearance between the high-voltage end and the low-voltage end of the first insulator, and thus mounting efficiency can be improved.

In an embodiment, the high-voltage end arcing component includes an arcing ball and a first arcing rod. An end of the first arcing rod is connected to the insulator, and another end of the first arcing rod is connected with the arcing ball. The arcing ball serves as an arcing end of the high-voltage end arcing component.

The arcing ball is arranged as the arcing end of the high-voltage end arcing component, so that the arcing ball can not only ensure reliable and controlled arc initiation, but also can reduce the occurrence of point discharge phenomenon with its spherical structure, ensuring the uniform distribution of the electric field.

In an embodiment, the first arcing rod has a multi-section bending structure including a plurality of first arcing sections that are smoothly connected in sequence.

Since two adjacent first arcing sections are arranged to be smoothly connected, the occurrence of point discharge phenomenon can be reduced, and the uniform distribution of the electric field can be ensured.

In an embodiment, the end of the first arcing rod connected to the insulator is connected with a first groove fitting. The first groove fitting connects the first arcing rod to the insulator via a high-voltage end connecting fitting.

Since the first arcing rod is connected to the insulator through the first groove fitting and the high-voltage end connecting fitting, the strength of connection between the first arcing rod and the insulator, as well as the mounting convenience, can be ensured.

In an embodiment, the first groove fitting is provided with a first groove into which the high-voltage end connecting fitting is inserted. The first groove fitting is further provided with a first through hole through which a locking member extends, allowing for a connection of the high-voltage end connecting fitting to the first groove fitting.

Since the first groove fitting is provided with the first groove and the first through hole, the locking member can directly extend through the first through hole to lock the first groove fitting and the high-voltage end connecting fitting, which can not only ensure the mounting convenience, but also ensure the connection strength.

In an embodiment, a grading ring is sleeved on the high-voltage end of the insulator. The grading ring is connected to the first groove fitting by a connecting bracket.

Since the grading ring is sleeved on the high-voltage end of the insulator, the uniform distribution of the electric field at the high-voltage end of the insulator can be ensured. In addition, since the grading ring is connected to the first groove fitting by the connecting bracket, the high-voltage end arcing component and the grading ring can be mounted as long as the first groove fitting is connected to the insulator, thereby improving the mounting efficiency.

The grading ring is provided with a notch. The first groove fitting and the grading ring are spaced apart from each other in a first direction parallel to an extension direction of the insulator. The another end of the first arcing rod which is not connected to the first groove fitting is bent at the notch in a direction away from the grading ring and connected to the arcing ball.

The above arrangement can not only save materials and reduce costs, but also ensure the distance between the grading ring and the arcing ball, which can avoid contact between the grading ring and the arcing ball, and ensure the arc initiation effect of the arcing ball.

In an embodiment, the grading ring, the connecting bracket, the first arcing rod and the arcing ball are arranged to be symmetrical with respect to a first plane. The first groove fitting is arranged to be symmetrical with respect to a second plane perpendicular to the first plane. An intersection line of the first plane and the second plane coincides with a central axis of the grading ring.

The above arrangement can ensure that the high-voltage end connecting fitting is subjected to a uniform external force exerted by the first groove fitting, and avoid the deformation of the high-voltage end connecting fitting due to uneven force, thereby prolonging the life of the high-voltage end connecting fitting.

In an embodiment, a high-voltage end grading ring is sleeved on the high-voltage end of the insulator, and is directly connected to the insulator by a connecting bracket.

In an embodiment, the low-voltage end arcing component includes a second arcing rod. An end of the second arcing rod is connected to the insulator, and another end of the second arcing rod serves as an arcing end of the low-voltage end arcing component.

Since the end of the second arcing rod serves as the arcing end of the low-voltage end arcing component, the cost can be reduced while ensuring reliable and controlled arc initiation.

In an embodiment, the second arcing rod has a multi-section bending structure including a plurality of second arcing sections that are smoothly connected in sequence.

Since the two adjacent second arcing sections are smoothly connected, the occurrence of point discharge phenomenon can be reduced and the uniform distribution of the electric field can be ensured.

In an embodiment, first and last second arcing sections of the plurality of second arcing sections are arranged at a certain angle with respect to each other.

In an embodiment, the end of the second arcing rod connected to the insulator is connected with a second groove fitting, and the second groove fitting is configured to connect the second arcing rod to the insulator.

The strength of connection between the second arcing rod and the insulator can be ensured by connecting the second arcing rod to the insulator via the second groove fitting.

In an embodiment, the composite crossarm further includes a high-voltage end connecting fitting including an end connected to the insulator and another end connected to a first connecting fitting. The high-voltage end connecting fitting is further connected with the high-voltage end arcing component. Two ends of the high-voltage end connecting fitting are each provided with a second through hole through which a locking element extends, allowing for a connection of the end of the high-voltage end connecting fitting to the insulator and a connection of the another end of the high-voltage end connecting fitting to the first connecting fitting.

Extension directions of the second through holes provided at the two ends of the high-voltage end connecting fitting are different from each other.

Since the extension directions of the second through holes at two ends of the high-voltage end connecting fitting are different, the reversing of the high-voltage end connecting fittings can be facilitated, making the mounting of the insulator more flexible.

In an embodiment, the high-voltage end connecting fitting includes a first connecting plate and a first connecting lug connected to the first connecting plate. The first connecting plate is provided with the second through hole so that the high-voltage end connecting fitting is capable of being connected to the first connecting fitting. The first connecting lug is provided with the second through hole so that the high-voltage end connecting fitting is capable of being connected to the insulator. The first connecting plate is further provided with a third through hole so that the high-voltage end connecting fitting is capable of being connected to the high-voltage end arcing component.

In an embodiment, the composite crossarm further includes a low-voltage end connecting fitting. Two ends of the low-voltage end connecting fitting are each provided with a fourth through hole through which a locking member extends, allowing for a connection of an end of the low-voltage end connecting fitting to the insulator and a connection of the another end of the low-voltage end connecting fitting to a second connecting fitting. Extension directions of the fourth through holes provided at the two ends of the low-voltage end connecting fitting are the same as each other.

In an embodiment, the low-voltage end connecting fitting includes a second connecting plate and a groove sub-fitting connected to the second connecting plate. The second connecting plate is provided with the fourth through hole so that the low-voltage end connecting fitting is capable of being connected to the insulator. The groove sub-fitting is provided with the fourth through hole so that the low-voltage end connecting fitting is capable of being connected to the second connecting fitting. The second connecting plate is further provided with a fifth through hole so that the low-voltage end connecting fitting is capable of being connected to the low-voltage end arcing component.

In an embodiment, the at least one insulator includes two post insulators and two suspension insulators. Or, the at least one insulator includes one post insulator and three suspension insulators.

The present disclosure further provides a power transmission tower, including a tower body and the above-mentioned composite crossarm connected to the tower body.

The composite crossarm of the present disclosure is provided with at least one arcing device, and the at least one arcing device includes a first arcing device. The electrical clearance between the high-voltage end arcing component and the low-voltage end arcing component of the first arcing device is less than the electrical clearance between the high-voltage end and the low-voltage end of all insulators. Therefore, in the case of overvoltage, the discharge clearance between the high-voltage end arcing component and the low-voltage end arcing component of the first arcing device is first to be broken down, which can prevent the burning of the insulator due to the heavy current flowing from the high-voltage end to the low-voltage end of any insulator, thereby protecting all the insulators and reducing potential safety hazards.

In addition, the insulator with the shed of the shortest length in the at least one insulator is connected with the first arcing device, so that as long as the electrical clearance between the high-voltage end and the low-voltage end of the arcing device connected to the first insulator with the shed of the shortest length is less than the electrical clearance between the high-voltage end and the low-voltage end of the first insulator, it can ensure that the electrical clearance between the high-voltage end and the low-voltage end of the arcing device connected to the first insulator is less than the electrical clearance between the high-voltage end and the low-voltage end of each insulator, which is convenient for mounting.

In addition, in this disclosure, the arcing ball serves as the arcing end of the high-voltage end arcing component. While ensuring reliable and controlled arc initiation, it can also reduce the occurrence of point discharge phenomenon and ensure the uniform distribution of the electric field. Furthermore, since the end of the first arcing rod is arranged as the arcing end of the low-voltage arcing component, the device cost can be reduced while ensuring reliable and controlled arc initiation.

The details of one or more embodiments of the present disclosure are set forth in the accompanying drawings and the detailed description below. Other features, objects and advantages of the present disclosure will be apparent from the description, drawings and claims.

BRIEF DESCRIPTION OF THE DRAWINGS

Various other advantages and benefits will become apparent to those of ordinary skill in the art upon reading the following detailed description of the preferred embodiments. In addition, in order to better describe and illustrate embodiments and/or examples of those concepts disclosed herein, reference may be made to one or more of the accompanying drawings. Additional details or examples used to describe the drawings should not be considered as limiting the scope of any of the disclosed concepts, the presently described embodiments and/or examples, and the best mode of these concepts currently understood.

DETAILED DESCRIPTION OF THE EMBODIMENTS

The technical solutions in the embodiments of the present disclosure will be described clearly and completely below with reference to the attached drawings in the embodiments of the present disclosure. Apparently, the described embodiments are only some of the embodiments of the present disclosure, not all of them. Based on the embodiments in present disclosure, all other embodiments obtained by persons of ordinary skill in the art without making creative efforts belong to the scope of protection of present disclosure.

Figure 1:
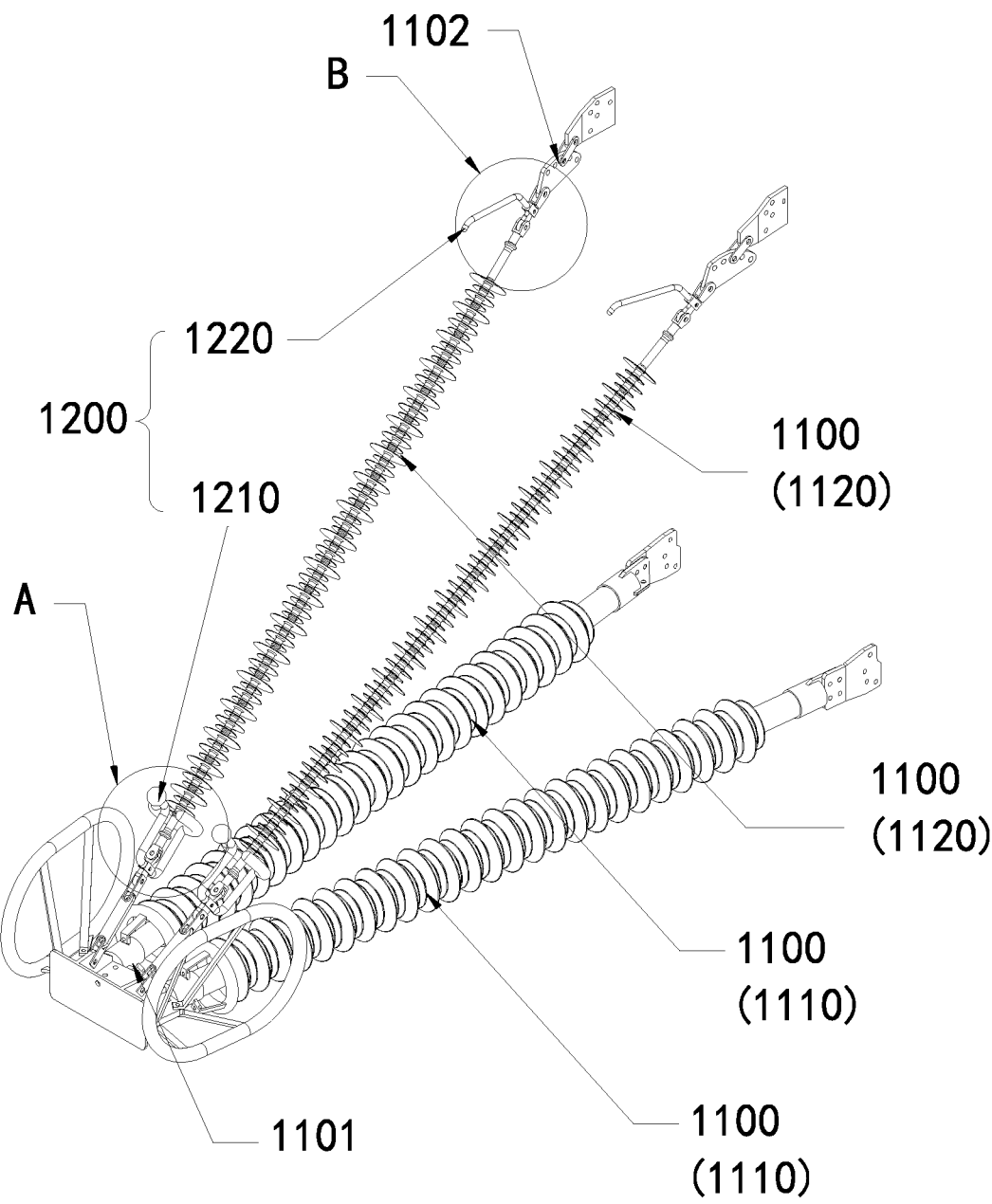
FIG. 1 is a schematic structural view of a composite crossarm according to one or more embodiments.

Referring to FIG. 1, in an embodiment of the present disclosure, a composite crossarm 1000 includes at least one insulator 1100 and at least one arcing device 1200.

When the composite crossarm 1000 includes only one insulator 1100, an end of the insulator 1100 is connected to a tower body of the power transmission tower, and another end of the insulator 1100 is used as an end of the composite crossarm 1000 to attach a transmission line. When the composite crossarm 1000 includes a plurality of insulators 1100, the plurality of insulators 1100 are connected to the tower body of the power transmission tower at one end, and at the other end they are connected to each other via a first connecting fitting 1101 to form an end of the composite crossarm 1000 which is used for attaching the transmission line. An end of the insulator 1100 connected to the tower body is a low-voltage end, and another end of the insulator 1100 is a high-voltage end, that is, the end of the insulator 1100 used for attaching the transmission line is a high-voltage end.

As shown in FIG. 1, when a plurality of insulators 1100 are provided, the plurality of insulators 1100 may include post insulators 1110 and suspension insulators 1120. The post insulators 1110 and suspension insulators 1120 are connected to the tower body of the power transmission tower at one end, and at the other end they are connected to each other via the first connecting fitting 1101 to form the end of the composite crossarm 1000 which is used for attaching the transmission line.

The number of post insulators 1110 and the number of suspension insulators 1120 are not limited in the present disclosure. One or more post insulators 1110 and suspension insulators 1120 may be provided. For example, as shown in FIG. 1, there are two post insulators 1110 and two suspension insulators 1120. The two post insulators 1110 and the two suspension insulators 1120 are connected to the tower body of the power transmission tower at one end, and at the other end they are connected to each other to form the end of the composite crossarm 1000 which is used for attaching the transmission line. The two suspension insulators 1120 are located on the same side of the two post insulators 1110 and adjacent to the two post insulators 1110, and an angle formed between the two post insulators 1110 is in a range from 20° to 50°, for example, 20°, 30°, 40°, 45°, or 50°. An angle formed between the post insulator 1110 and the adjacent suspension insulator 1120 is in a range from 15° to 45°, for example, 15°, 30° or 45°. The arrangement of the two post insulators 1110 and the two suspension insulators 1120 makes the composite crossarm 1000 and the tower body of the transmission tower form a stable triangular structure, which can greatly improve the stability of the composite crossarm 1000.

The two post insulators 1110 are mounted at the same height, the two suspension insulators 1120 are mounted at the same height, and the two suspension insulators 1120 are located above the two post insulators 1110. The angles formed between the two post insulators 1110 and the adjacent suspension insulators 1120 are equal, that is, the composite crossarm 1000 has a symmetrical structure to ensure that the composite crossarm 1000 is evenly stressed, but the present disclosure is not limited thereto. For example, in other embodiments, the angle formed between one post insulator 1110 and the adjacent suspension insulator 1120 is 20°, and the angle formed between the other post insulator 1110 and the adjacent suspension insulator 1120 is 45°.

At least one arcing device 1200 is connected to at least one insulator 1100. One arcing device 1200 may be connected to one insulator 1100 or to different insulators 1100 as long as arcing components of the arcing device 1200 are located at a high-voltage end and a low-voltage end of the insulator 1100 respectively. Hereinafter, an example in which one arcing device 1200 is connected to one insulator 1100 will be described.

Each arcing device 1200 includes a high-voltage end arcing component 1210 and a low-voltage end arcing component 1220. The high-voltage end arcing component 1210 is connected to the high-voltage end of the insulator 1100, and the low-voltage end arcing component 1220 is connected to the low-voltage end of the insulator 1100.

In all the arcing devices 1200, there is at least one arcing device 1200 having an electrical clearance between the high-voltage end arcing component 1210 and the low-voltage end arcing component 1220 less than an electrical clearance between the high-voltage end and the low-voltage end of any one of the at least one insulator 1100, that is, less than electrical clearances between the high-voltage ends and the low-voltage ends of all insulators 1100 of the composite crossarm 1000. For ease of illustration, the definition of the first arcing device 1200 is introduced below: if the electrical clearance between the high-voltage end arcing component 1210 and the low-voltage end arcing component 1220 of an arcing device 1200 is less than the electrical clearance between the high-voltage end and the low-voltage end of any one of the at least one insulator 1100, such an arcing device 1200 is defined as the first arcing device 1200.

That is, in all the arcing devices 1200, there is at least one first arcing device 1200 with the electrical clearance between the high-voltage end arcing component 1210 and the low-voltage end arcing component 1220 less than the electrical clearances between the high-voltage ends and the low-voltage ends of all the insulators 1100. Therefore, in the case of overvoltage, for example, when being struck by lightning, the discharge clearance between the high-voltage end arcing component 1210 and the low-voltage end arcing component 1220 of the first arcing device 1200 is first to be broken down, which can prevent the burning of the insulator 1100 due to the heavy current flowing from the high-voltage end to the low-voltage end of any insulator 1100, thereby protecting all the insulators 1100 and reducing potential safety hazards.

The post insulator 1110 may be connected with the first arcing device 1200, or the suspension insulator 1120 may be connected with the first arcing device 1200.

For the insulator 1100, the electrical clearance between the high-voltage end and the low-voltage end is equal to a length of a shed of the insulator 1100, that is, the shortest distance between approaching ends of metal fittings located at both ends of the insulator 1100. In order to facilitate mounting, in this embodiment, the insulator 1100 with the shed of the shortest length among all the insulators 1100 is connected to the first arcing device 1200. For ease of illustration, the insulator 1100 with the shed of the shortest length among all the insulators 1100 is defined as a first insulator 1100.

When mounting the arcing device 1200, as long as the electrical clearance between the high-voltage end and the low-voltage end of the arcing device 1200 connected to the first insulator 1100 is less than the electrical clearance between the high-voltage end and the low-voltage end of the first insulator 1100, it can be ensured that the electrical clearance between the high-voltage end and the low-voltage end of the arcing device 1200 connected to the first insulator 1100 is less than the electrical clearances between the high-voltage ends and the low-voltage ends of all insulators 1100. Therefore, during mounting, it is just required that the distance between the arcing end of the high-voltage end arcing component 1210 connected to the first insulator 1100 and the arcing end of the low-voltage end arcing component 1220 connected to the first insulator 1100 is less than the length of the shed of the first insulator 1100, and mounting efficiency can be ensured.

In order to strengthen the protective effect of at least one arcing device 1200 on the insulator 1100, the electrical clearance between the high-voltage end arcing component 1210 and the low-voltage end arcing component 1220 of each arcing device 1200 is arranged to be less than the electrical clearances between the high-voltage ends and the low-voltage ends of all insulators 1100. That is, all arcing devices 1200 are the first arcing devices 1200.

The length of the shed of the suspension insulator 1120 is shorter than the length of the shed of the post insulator 1110, that is, the electrical clearance between the high-voltage end and the low-voltage end of the suspension insulator 1120 is less than the electrical clearance between the high-voltage end and the low-voltage end of the post insulator 1110. When being struck by lightning, the suspension insulator 1120 is hit before the post insulator 1110, so in order to protect the suspension insulator 1120, as shown in FIG. 1, the suspension insulator 1120 is connected with the first arcing device 1200.

Figure 2:
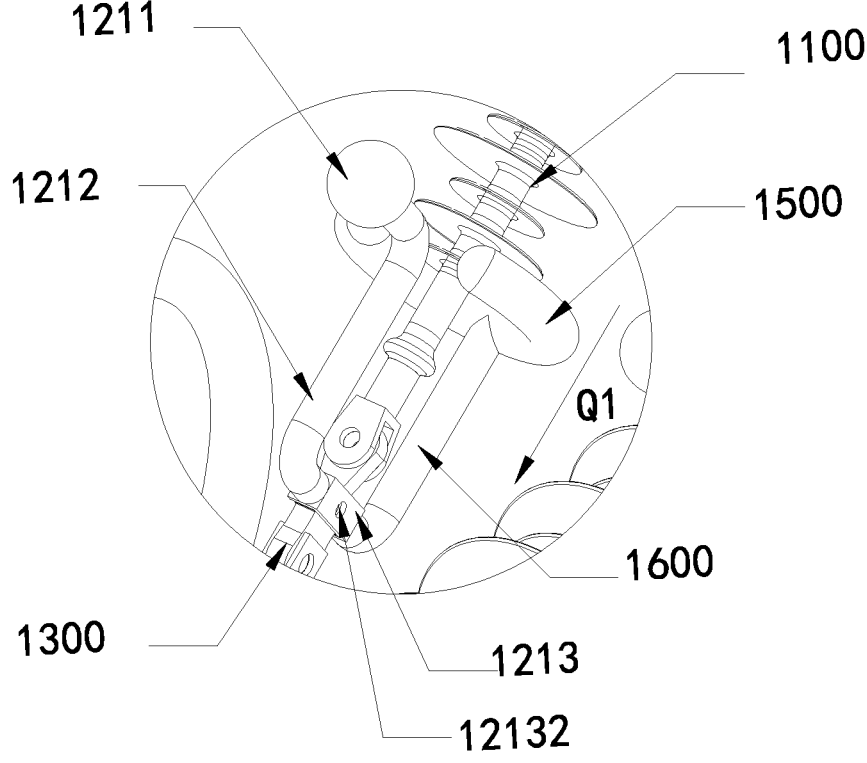
FIG. 2 is an enlarged schematic view of portion A in FIG. 1.
Figure 3:
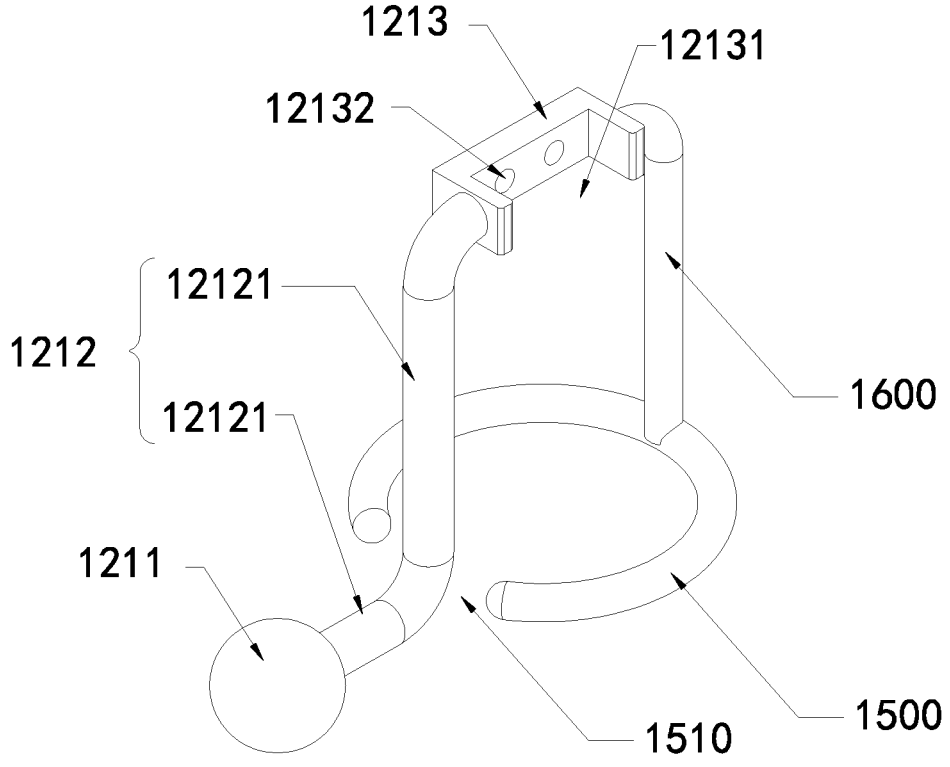
FIG. 3 is a structural schematic view of an arcing ball, a first arcing rod, a first groove fitting, a connecting bracket, and a grading ring in FIG. 2.

Referring to FIGS. 1 to 3, the high-voltage end arcing component 1210 includes an arcing ball 1211 and a first arcing rod 1212. An end of the first arcing rod 1212 is connected to the insulator 1100, and another end of the first arcing rod 1212 is connected to the arcing ball 1211. The arcing ball 1211 serves as an arcing end of the high-voltage end arcing component 1210.

Considering that the electric field intensity at the high-voltage end of the insulator 1100 is high, arranging the arcing ball 1211 as the arcing end of the high-voltage end arcing component 1210 can ensure reliable and controlled arc initiation, and the spherical structure can also reduce the occurrence of point discharge phenomenon and ensure the even distribution of the electric field.

Figure 4:
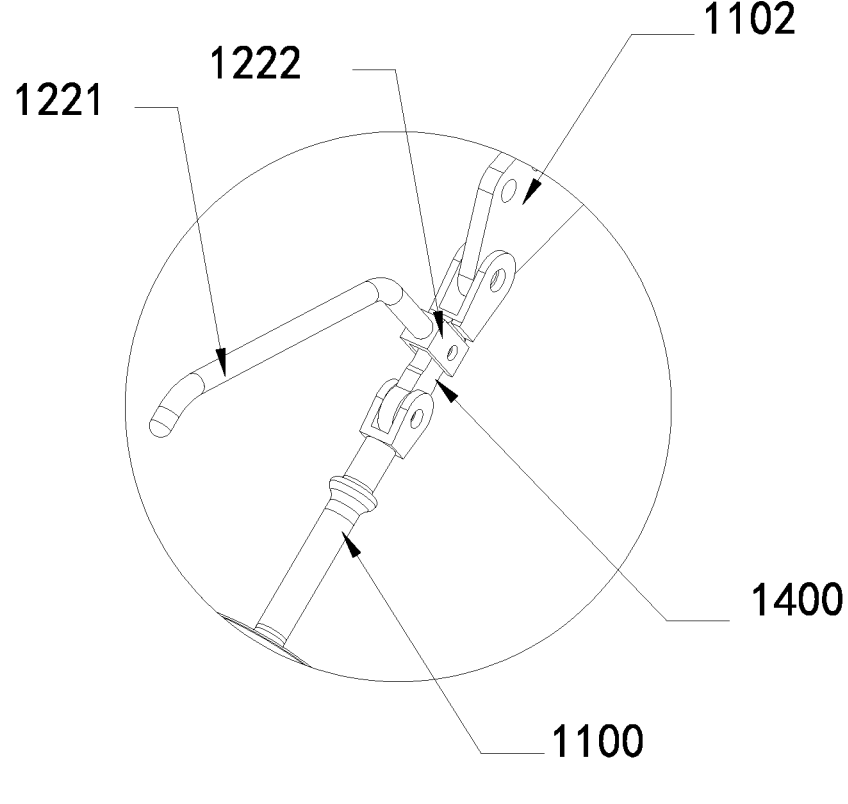
FIG. 4 is an enlarged schematic view of portion B in FIG. 1.
Figure 5:
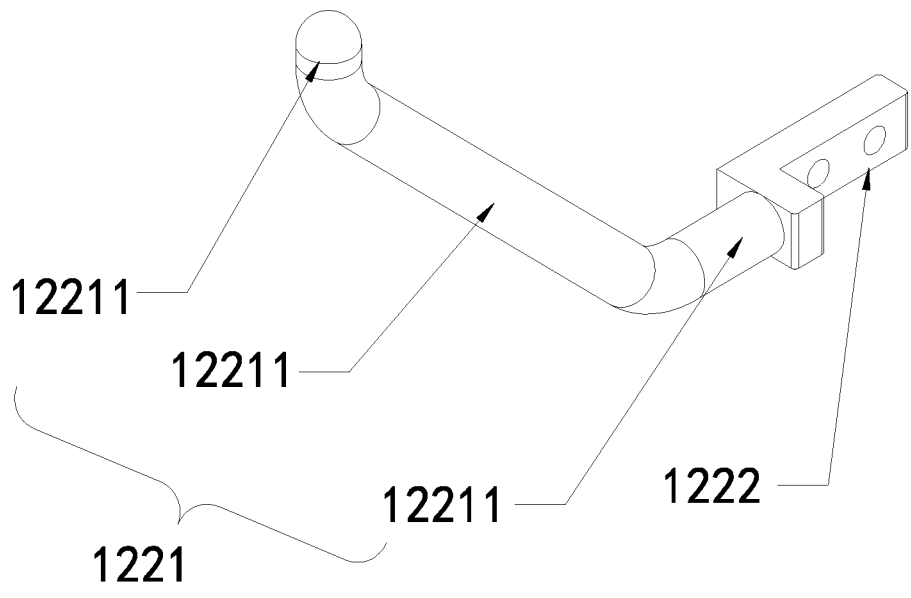
FIG. 5 is a schematic structural view of a second arcing rod and a second groove fitting in FIG. 4 in another application scenario.

Referring to FIGS. 1, 4 and 5, the low-voltage end arcing component 1220 includes a second arcing rod 1221. An end of the second arcing rod 1221 is connected to the insulator 1100, and another end of the second arcing rod 1221 serves as the arcing end of the low-voltage end arcing component 1220.

Considering that the electric field intensity at the low-voltage end of the insulator 1100 is low, in order to reduce the device cost, the arcing end of the low-voltage end arcing component 1220 only needs to ensure reliable and controlled arc initiation, so a free end of the second arcing rod 1221 not connected to the insulator 1100 serves as the arcing end of the low-voltage end arcing component 1220.

In other embodiments, without considering the cost, the low-voltage end arcing component and the high-voltage end arcing component 1210 may also be configured in the same way, that is, use the arcing ball as the arcing end.

Continuing to refer to FIGS. 1 to 3, in an application scenario, the end of the first arcing rod 1212 connected to the insulator 1100 is connected to a first groove fitting 1213. The first groove fitting 1213 connects the first arcing rod 1212 to the insulator 1100 via a high-voltage end connecting fitting 1300.

The above arrangement can ensure the strength of connection between the first arcing rod 1212 and the insulator 1100, as well as the mounting convenience.

The first groove fitting 1213 is formed with a first groove 12131 into which the high-voltage end connecting fitting 1300 is inserted. The first groove fitting 1213 is provided with first through holes 12132, so that locking members such as bolts and rivets can extend through the first through holes 12132 to lock the first groove fitting 1213 and the high-voltage end connecting fitting 1300. In order to reduce the occurrence of point discharge phenomenon, the surface of the first groove fitting 1213 is polished to a smooth surface without sharp edges or corners.

The first groove fitting 1213 is provided with the first groove 12131 and the first through hole 12132, so that the locking members can directly extend through the first through hole 12132 to lock the first groove fitting 1213 and the high-voltage end connecting fitting 1300 that is inserted into the first groove 12131, which can not only ensure the mounting convenience, but also ensure the connection strength.

An end of the high-voltage end connecting fitting 1300 is connected to the insulator 1100, and another end of the high-voltage end connecting fitting 1300 is connected to the first connecting fitting 1101. The specific configuration of the high-voltage end connecting fitting 1300 may refer to the following description.

The first arcing rod 1212 has a multi-section bending structure including a plurality of first arcing sections 12121 that are connected in sequence. In order to reduce the occurrence of point discharge phenomenon and ensure uniform distribution of the electric field, the plurality of first arcing sections 12121 are smoothly connected in sequence.

In order to further reduce the occurrence of point discharge phenomenon and ensure the uniform distribution of the electric field, the entire surface of the first arcing rod 1212 is a smooth surface. That is, the surface of the first arcing rod 1212 is polished to avoid sharp edges and corners.

In order to achieve a uniform distribution of the electric field at the high-voltage end of the insulator 1100, a grading ring 1500 is arranged around the high-voltage end of the insulator 1100. In addition, in order to improve the mounting efficiency, the grading ring 1500 is arranged to be connected to the first groove fitting 1213 by a connecting bracket 1600, so that during mounting, as long as the first groove fitting 1213 is connected to the insulator 1100, the first arcing rod 1212 and the grading ring 1500 can be mounted at the same time.

The first groove fitting 1213 and the grading ring 1500 are spaced apart from each other in a first direction Q1 parallel to an extension direction of the insulator 1100. In addition, the grading ring 1500 is provided with a notch 1510. The end of the first arcing rod 1212 not connected to the first groove fitting 1213 is bent at the notch 1510 in a direction away from the grading ring 1500 and connected to the arcing ball 1211.

The grading ring 1500 is provided with the notch 1510, so that materials can be saved, and the arcing ball 1211 can be prevented from contacting the grading ring 1500, so as to ensure the arcing initiation effect of the arcing ball 1211.

In other embodiments, the grading ring may not be provided with the notch, as long as the arcing ball is not in contact with the grading ring.

Figure 6:
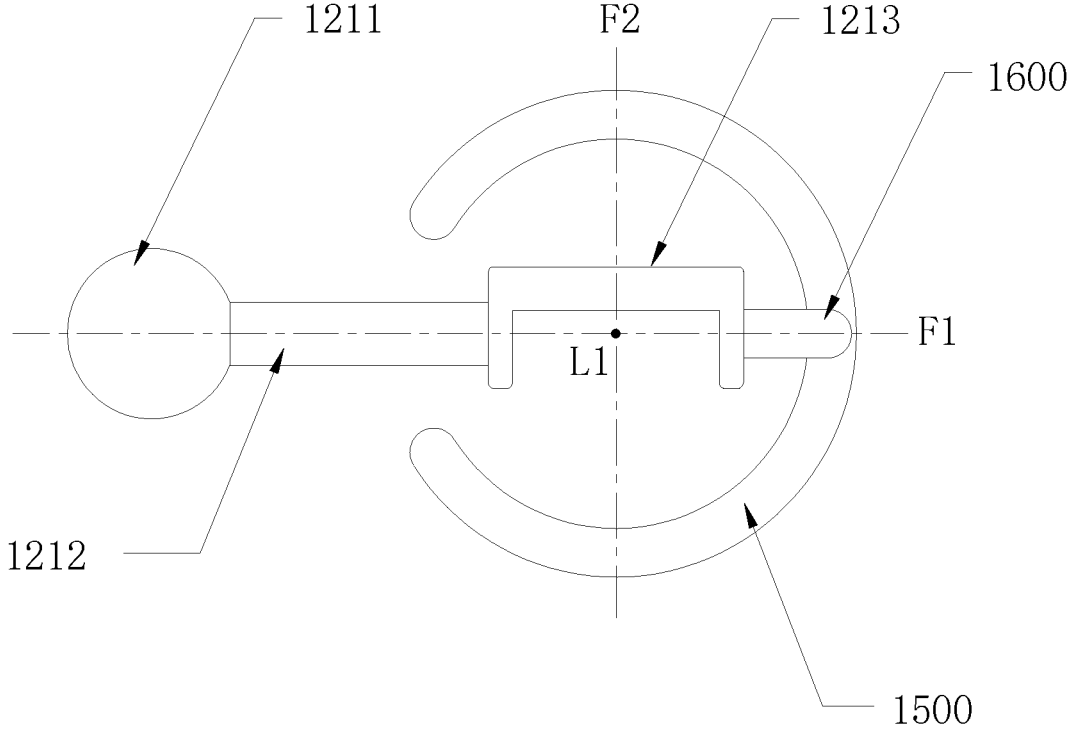
FIG. 6 is a top view of the structure in FIG. 3.

Referring to FIGS. 3 and 6, in this embodiment, in order to ensure that the first groove fitting 1213 is evenly stressed, the grading ring 1500, the connecting bracket 1600, the first arcing rod 1212 and the arcing ball 1211 are arranged to be symmetrical with respect to a first plane F1. The first groove fitting 1213 is arranged to be symmetrical with respect to a second plane F2. The first plane F1 is perpendicular to the second plane F2, and an intersection line of the first plane F1 and the second plane F2 coincides with a central axis L1 of the grading ring 1500. When the first groove fitting 1213 is connected to the high-voltage end connecting fitting 1300, the first plane F1 and the second plane F2 are parallel to the extension direction of the insulator 1100. This ensures that the high-voltage end connecting fitting 1300 is subjected to a uniform external force exerted by the first groove fitting 1213, thereby avoiding the deformation of the high-voltage end connecting fitting 1300 due to uneven force prolonging the life of the high-voltage end connecting fitting 1300. The configuration of the high-voltage end arcing component 1210 is not specifically limited in the present disclosure, as long as it can ensure reliable and controlled arc initiation.

Continuing to refer to FIGS. 1, 4 and 5, in this embodiment, the second arcing rod 1221 has a multi-section bending structure including a plurality of second arcing sections 12211 that are smoothly connected in sequence.

Arranging the two adjacent second arcing sections 12211 to be connected smoothly can avoid the point discharge phenomenon, thereby ensuring the uniform distribution of the electric field.

The shape of the second arcing rod 1221 is not limited in the present disclosure. For example, in an application scenario, the first and last second arcing sections 12211 of the plurality of second arcing sections 12211 are arranged at a certain angle with respect to each other, such as 45° or 90°, etc.

In an application scenario, as shown in FIG. 5, three second arcing sections 12211 are provided, and in this case, the angle formed between two adjacent second arcing sections 12211 is an obtuse angle. For example, the angle between the two adjacent second arcing sections 12211 is 135°.

In order to further avoid point discharge phenomenon, the surface of the second arcing section 12211 is polished to a smooth surface.

In order to ensure the strength of connection between the second arcing rod 1221 and the insulator 1100 and to facilitate the mounting of the second arcing rod 1221, the end of the second arcing rod 1221 connected to the insulator 1100 is connected to a second groove fitting 1222. The second groove fitting 1222 is used to connect the second arcing rod 1221 to the insulator 1100. Specifically, the second groove fitting 1222 connects the second arcing rod 1221 to a low-voltage end connecting fitting 1400. An end of the low-voltage end connecting fitting 1400 is connected to the insulator 1100, and another end of the low-voltage end connecting fitting 1400 is connected to a second connecting fitting 1102. The second connecting fitting 1102 is used to be connected to the tower body. The specific configuration of the low-voltage end connecting fitting 1400 may refer to the following description.

The second groove fitting 1222 may be a U-shaped groove (as shown in FIG. 4) or an L-shaped groove (as shown in FIG. 5), which is not limited herein.

In addition, in order to reduce the occurrence of point discharge phenomenon, the surface of the second groove fitting 1222 is polished without sharp edges or corners.

Figure 7:
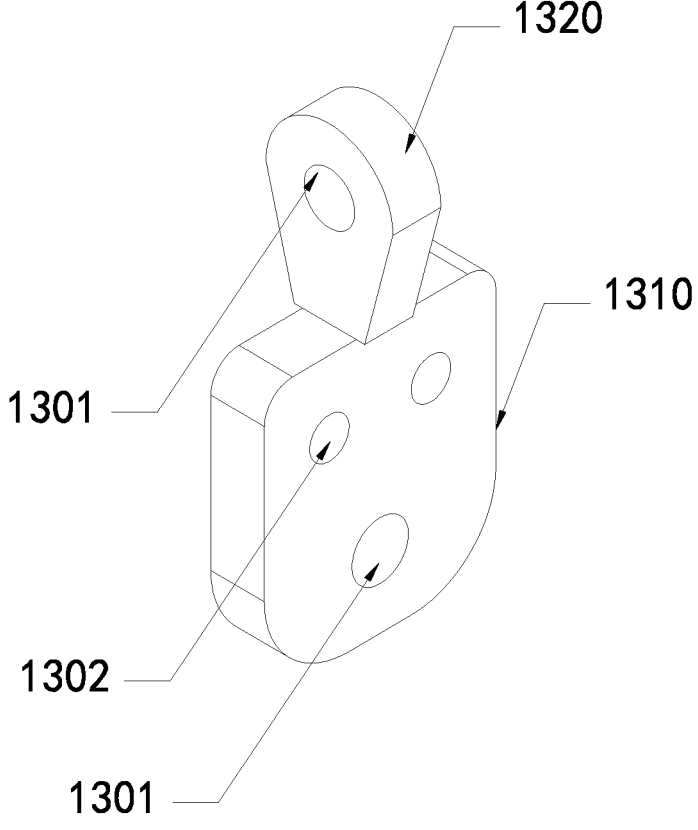
FIG. 7 is a schematic structural view of a high-voltage end connecting fittings in FIG. 2.

Referring to FIGS. 1, 2 and 7, two ends of the high-voltage end connecting fitting 1300 are each provided with a second through hole 1301 through with a locking element such as a bolt or a rivet extends, allowing for the connection of the high-voltage end connecting fitting 1300 to the insulator 1100 and the connection of another end of the high-voltage end connecting fitting 1300 to the first connecting fitting 1101. In addition, extension directions of the second through holes 1301 provided at the two ends of the high-voltage end connecting fitting 1300 are different from each other.

The extension directions of the second through holes 1301 at both ends of the high-voltage end connecting fitting 1300 are arranged to be different from each other, which facilitates the reversing of the high-voltage end connecting fitting 1300 and makes the mounting of the insulator 1100 more flexible.

In an application scenario, as shown in FIG. 7, the extension directions of the second through holes 1301 at both ends of the high-voltage end connecting fitting 1300 are perpendicular to each other.

Certainly, in other embodiments, the extension directions of the second through holes at both ends of the high-voltage end connecting fitting may also be the same as each other.

Continuing to refer to FIGS. 1, 2, 3 and 7, the high-voltage end connecting fitting 1300 includes a first connecting plate 1310 and a first connecting lug 1320.

The first connecting plate 1310 is provided with the second through hole 1301 and third through holes 1302. The extension directions of the second through hole 1301 and the third through holes 1302 of the first connecting plate 1310 are the same as each other. The locking member extends through the third through hole 1302 to lock the high-voltage end connecting fitting 1300 and the high-voltage end arcing component 1210. The first connecting lug 1320 is connected to the first connecting plate 1310 and provided with the second through hole 1301.

A locking member extends through the third through hole 1302 and the first through hole 12132 of the first groove fitting 1213 to lock the high-voltage end arcing component 1210 and the high-voltage end connecting fitting 1300. Another locking member extends through the second through hole 1301 of the first connecting plate 1310 to connect the first connecting plate 1310 to the first connecting fitting 1101. A further locking member extends through the second through hole 1301 of the first connecting lug 1320 to connect the high-voltage end arcing component 1210 to the insulator 1100.

One third through hole 1302 may be provided (as shown in FIG. 2, because of the blocking of the first groove fitting 1213, the third through hole 1302 is not visible in FIG. 2), two third through holes 1302 may also be provided (as shown in FIG. 7), and correspondingly, one first through hole 12132 (as shown in FIG. 2) or two first through holes 12132 (as shown in FIG. 3) may also be provided, which is not limited herein.

That is, the first connecting plate 1310 is connected to the first connecting fitting 1101 and the high-voltage end arcing component 1210, and the first connecting lug 1320 is connected to the insulator 1100.

Certainly, in other embodiments, it is also possible that the first connecting lug 1320 is connected to the first connecting fitting 1101 and the high-voltage end arcing component 1210, and the first connecting plate 1310 is connected to the insulator 1100.

The configuration of the high-voltage end connecting fitting 1300 is not specifically limited in the present disclosure, as long as it can connect the high-voltage end arcing component 1210 to the insulator 1100.

Figure 8:
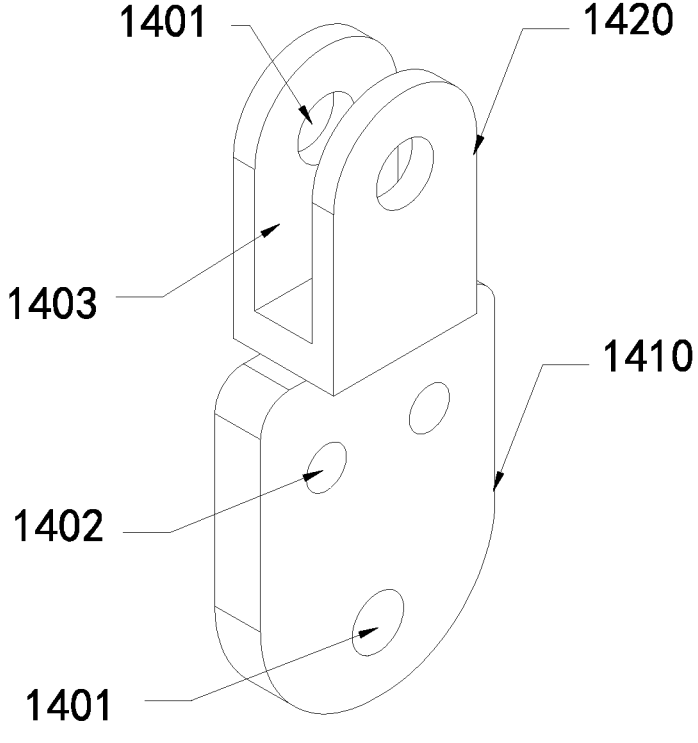
FIG. 8 is a schematic structural view of a low-voltage end connecting fittings in FIG. 4.

Referring to FIGS. 1, 4 and 8, two ends of the low-voltage end connecting fitting 1400 are each provided with a fourth through hole 1401 through which a locking member extends, allowing for the connection of an end of the low-voltage end connecting fitting 1400 to the insulator 1100 and the connection of another end of the low-voltage end connecting fitting 1400 to the second connecting fitting 1102. Extension directions of the fourth through holes 1401 provided at the two ends of the low-voltage end connecting fitting 1400 are the same as each other.

Certainly, in other embodiments, the extension directions of the fourth through holes 1401 at both ends of the low-voltage end connecting fitting 1400 may also be different from each other, as long as it can facilitate the connection of the insulator 1100, and which is not limited herein.

Continuing to refer to FIGS. 1, 4 and 8, the low-voltage end connecting fitting 1400 includes a second connecting plate 1410 and a groove sub-fitting 1420.

The second connecting plate 1410 is provided with the fourth through hole 1401 and fifth through holes 1402 extending in the same direction as the fourth through hole 1401. Locking members extend through the fifth through holes 1402 to lock the low-voltage end connecting fitting 1400 and the low-voltage end arcing component 1220. The groove sub-fitting 1420 is connected to the second connecting plate 1410, and is provided with the fourth through hole 1401 and a second groove 1403 into which the second connecting fitting 1102 is inserted.

A locking member extends through the fifth through hole 1402 and the second groove fitting 1222 to lock the low-voltage end arcing component 1220 and the low-voltage end connecting fitting 1400. Another locking member extends through the fourth through hole 1401 of the second connecting plate 1410 to connect the second connecting plate 1410 to the insulator 1100. A further locking member extends through the fourth through hole 1401 of the groove sub-fitting 1420 to connect the groove sub-fitting 1420 to the second connecting fitting 1102 inserted into the second groove 1403.

One fifth through hole 1402 may be provided (as shown in FIG. 4, because of the blocking of the second groove fitting 1222, the fifth through hole 1402 is not visible in FIG. 4), or two fifth through holes 1402 may be provided (as shown in FIG. 8), and which is not limited herein.

That is, the second connecting plate 1410 is connected to the insulator 1100, and the groove sub-fitting 1420 is connected to the second connecting fitting 1102.

Certainly, in other embodiments, the second connection plate 1410 may also be connected to the second connecting fitting 1102, and the groove sub-fitting 1420 may be connected to the insulator 1100.

The configuration of the low-voltage end connecting fitting 1400 is not specifically limited in the present disclosure, as long as the low-voltage end arcing component 1220 can be connected to the insulator 1100.

US 12,567,729 B2

13

Figure 9:
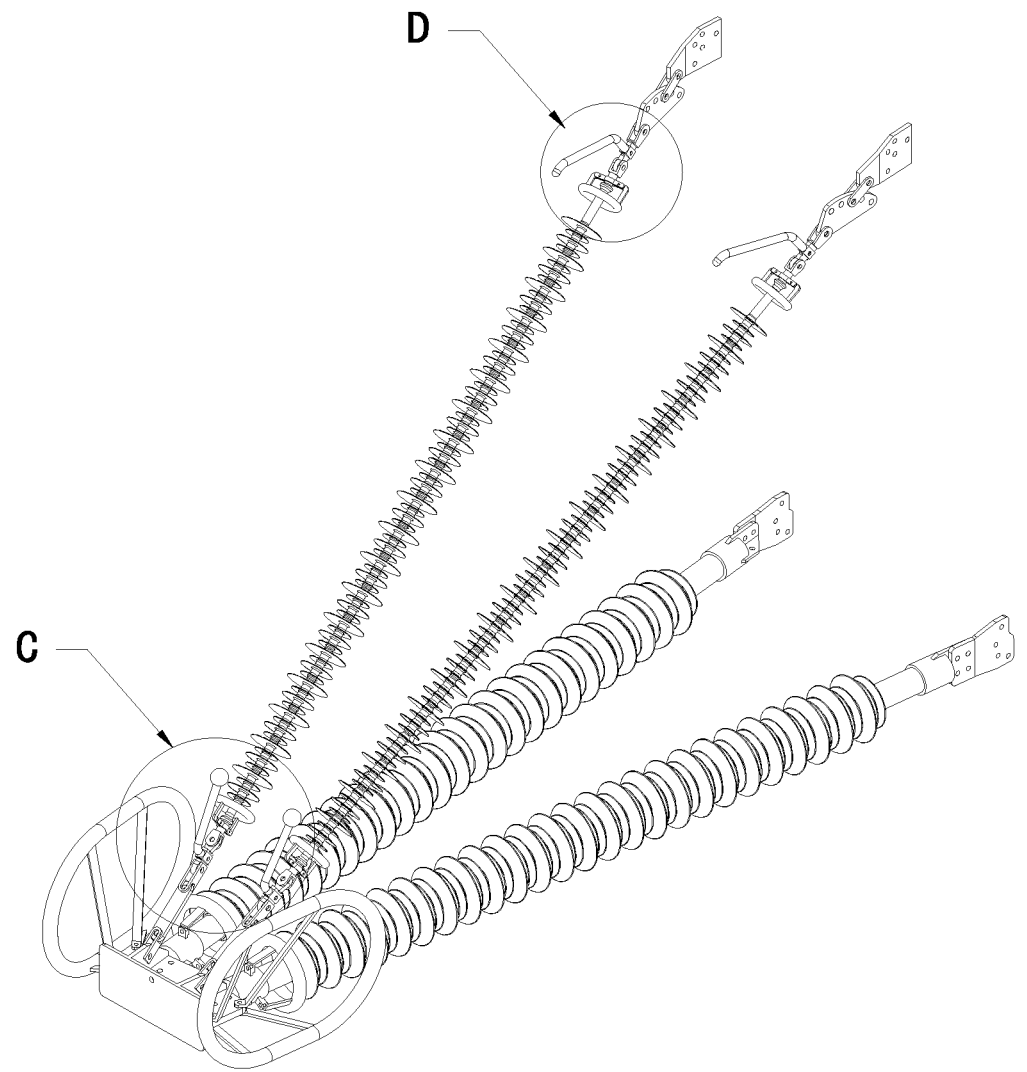
FIG. 9 is a schematic structural view of a composite crossarm according to another one or more embodiments.
Figure 10:
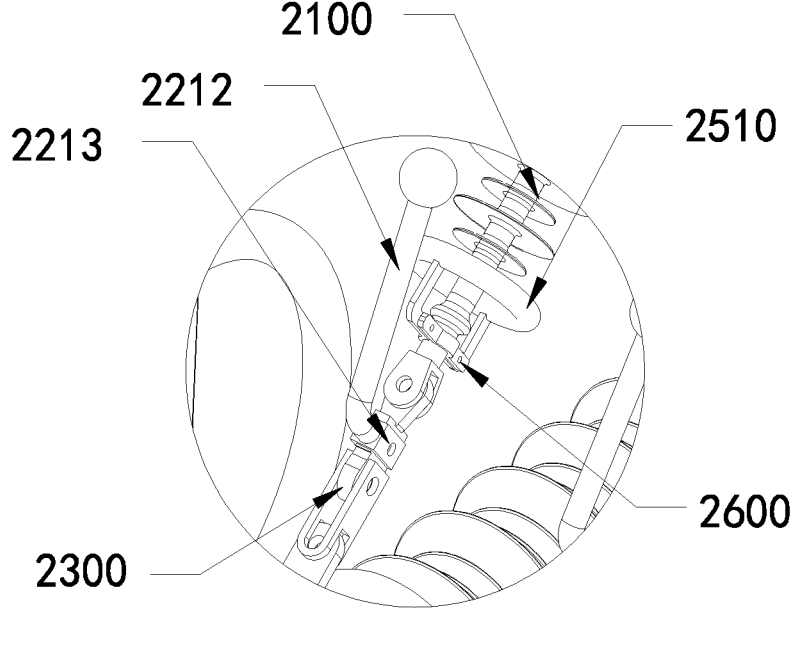
FIG. 10 is an enlarged schematic view of portion C in FIG. 9.

Referring to FIGS. 9 and 10, this embodiment differs from the above-mentioned embodiments in that a connecting bracket 2600 connected to a high-voltage end grading ring 2510 that is sleeved on a high-voltage end of an insulator 2100 is not connected to a first groove fitting 2213. In this case, the connecting bracket 2600 is directly connected to the insulator 2100, and the first groove fitting 2213 is connected to the insulator 2100 through a high-voltage end connecting fitting 2300. In this case, during assembly, the high-voltage end grading ring 2510 and the high-voltage end connecting fitting 2300 are separately connected to the insulator 2100. That is, a position where a first arcing rod 2212 is connected to the insulator 2100 is different from a position of the high-voltage end grading ring 2510 is connected to the insulator 2100.

Figure 11:
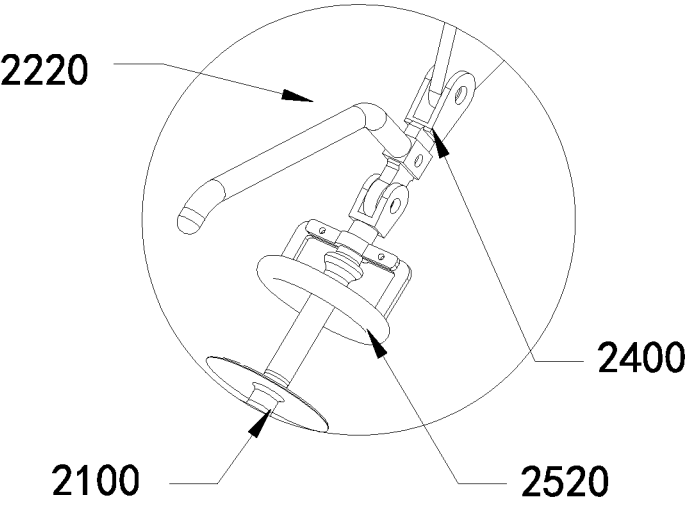
FIG. 11 is an enlarged schematic view of portion D in FIG. 9.

In addition, referring to FIGS. 9 and 11, in order to achieve a uniform distribution of the electric field at the low-voltage end of the insulator 2100, a low-voltage end grading ring 2520 is further sleeved on a low-voltage end of the insulator 2100. Similar to the high-voltage end grading ring 2510 sleeved on the high-voltage end of the insulator 2100, a low-voltage end grading ring 2520 sleeved at the low-voltage end of the insulator 2100 can be or not be connected to the low-voltage end arcing component 2220, and which is not limited herein. For example, in an application scenario of FIG. 11, the low-voltage end grading ring 2520 is directly connected to the insulator 2100, and the low-voltage end arcing component 2220 is connected to the insulator 2100 via a low-voltage end connecting fitting 2400.

Figure 12:
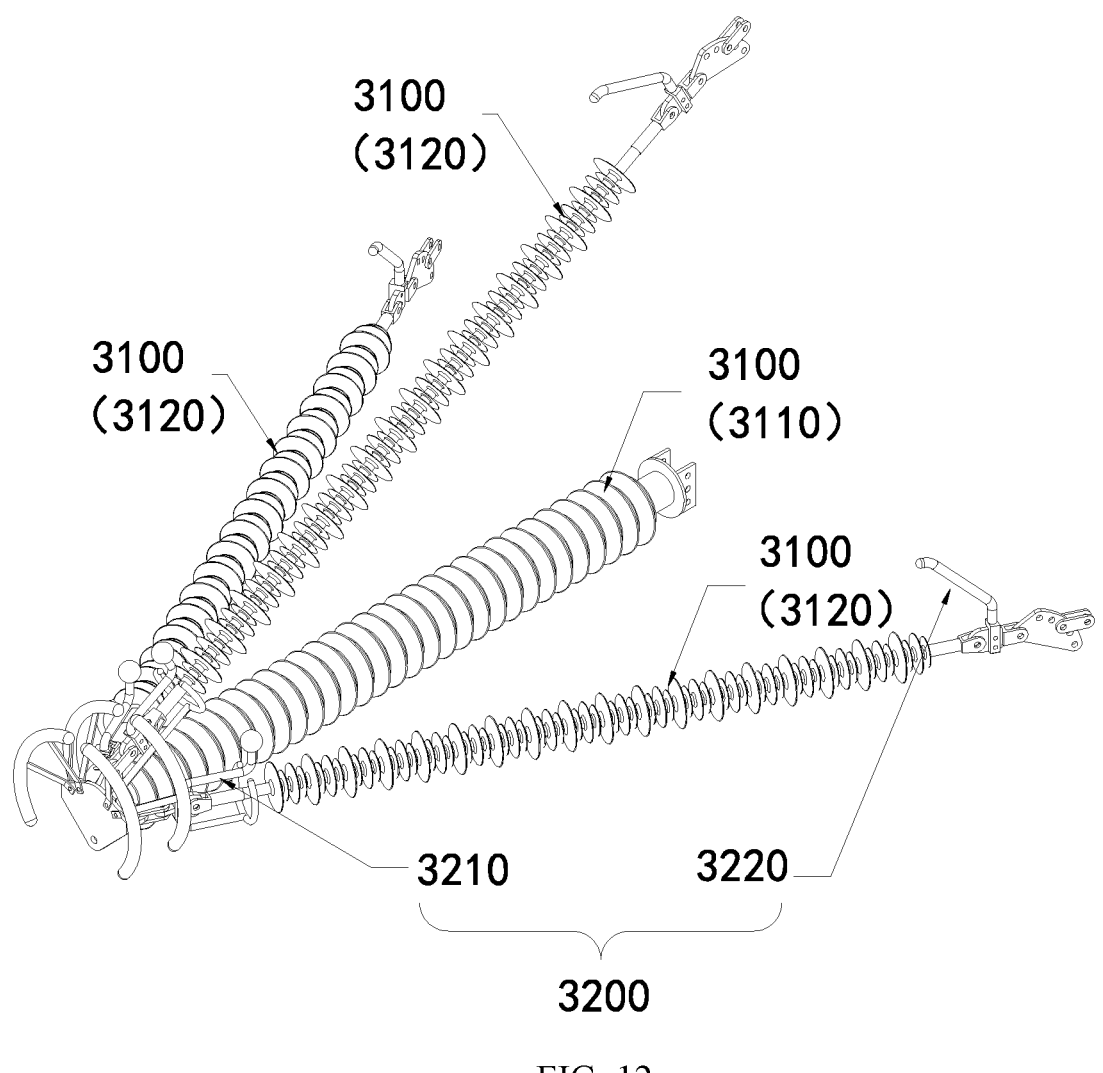
FIG. 12 is a schematic structural view of a composite crossarm according to yet another one embodiment or more embodiments.
Figure 13:
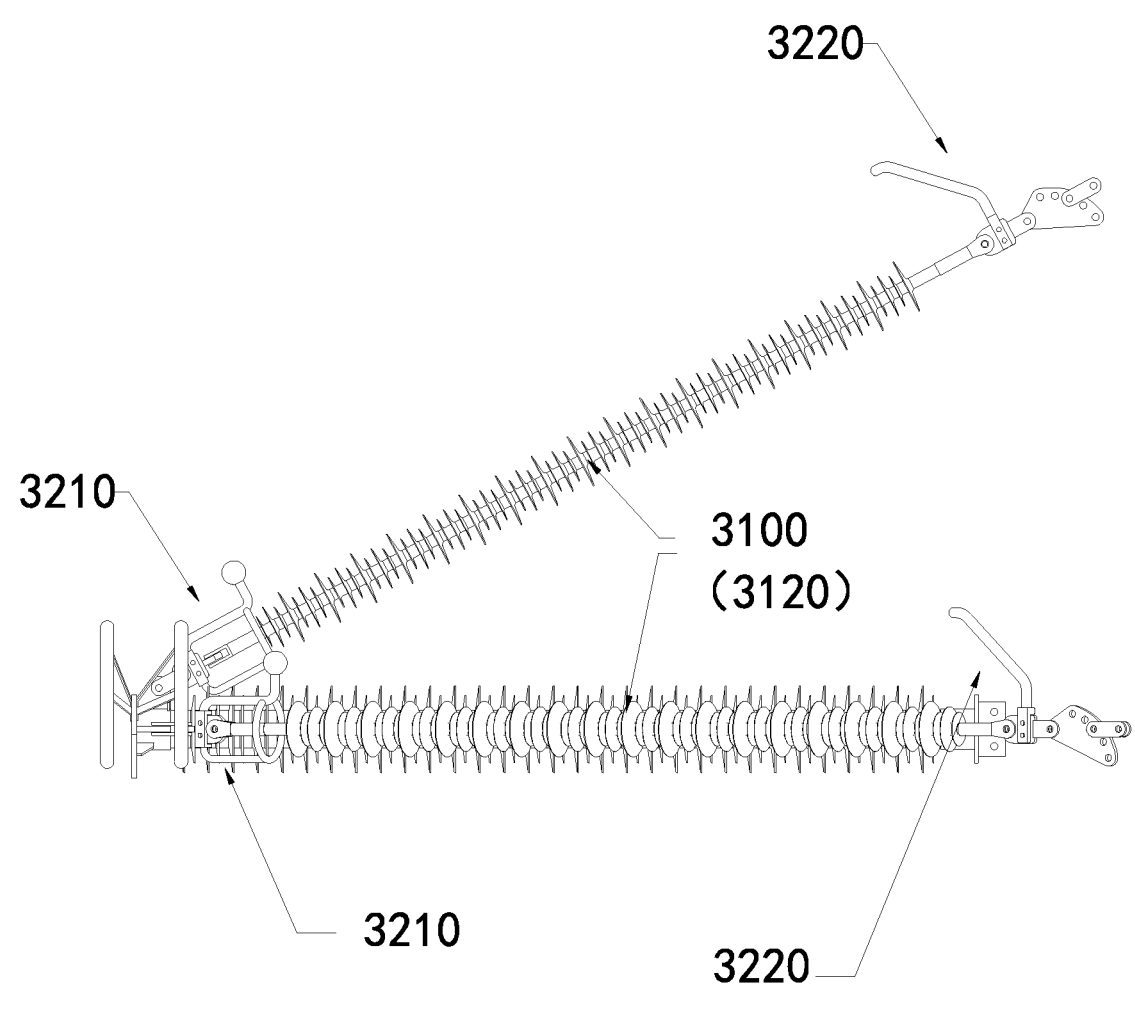
FIG. 13 is a schematic structural view of the composite crossarm from another perspective different than FIG. 12.

Referring to FIGS. 12 and 13, this embodiment differs from the above-mentioned embodiment lies in that, one post insulator 3110 is provided, and three suspension insulators 3120 are provided. Among the three suspension insulators 3120, axes of two suspension insulators 3120 and an axis of the post insulator 3110 are in the same plane.

In this case, the two suspension insulators 3120 whose axes are in the same plane as the axis of the post insulator 3110 are both defined as first suspension insulators 3120, and the remaining suspension insulator 3120 is defined as a second suspension insulator 3120. Distances from the second suspension insulator 3120 to the two first suspension insulators 3120 are equal to each other. An angle formed between the two first suspension insulators 3120 is in a range from 45° to 90°, for example, 45°, 60° or 90°. An angle formed between the second suspension insulator 3120 and the post insulator 3110 is in a range from 25° to 45°, for example, 25°, 30°, 35° or 45°.

The axes of the above-mentioned two suspension insulators 3120 and the axis of the post insulator 3110 are in the same plane, so that the composite crossarm 3000 and the tower body of the power transmission tower can form a stable triangular structure, which can greatly improve the stability performance of the composite crossarm 3000.

In this embodiment, the three suspension insulators 3120 are each connected to an arcing device 3200. The arcing device 3200 includes a high-voltage end arcing component 3210 and a low-voltage end arcing component 3220. The high-voltage end arcing component 3210 has the same structure as the high-voltage end arcing component 1210 in the aforementioned embodiments, and the low-voltage end arcing component 3220 has the same structure as the low-voltage end arcing component 1220 in the aforementioned embodiment. In addition, the connection relationship between the high-voltage end arcing component 3210 and the insulator 3100 is the same as that between the high-voltage end arcing component 1210 and the insulator 1100 in the aforementioned embodiments; the connection relationship between the low-voltage end arcing component 3220 and the insulator 3100 is the same as that between the low-voltage end arcing component 1220 and the insulator 1100 in the aforementioned embodiments. Reference may be made to the above embodiments for details, and which will not be repeated herein.

Figure 14:
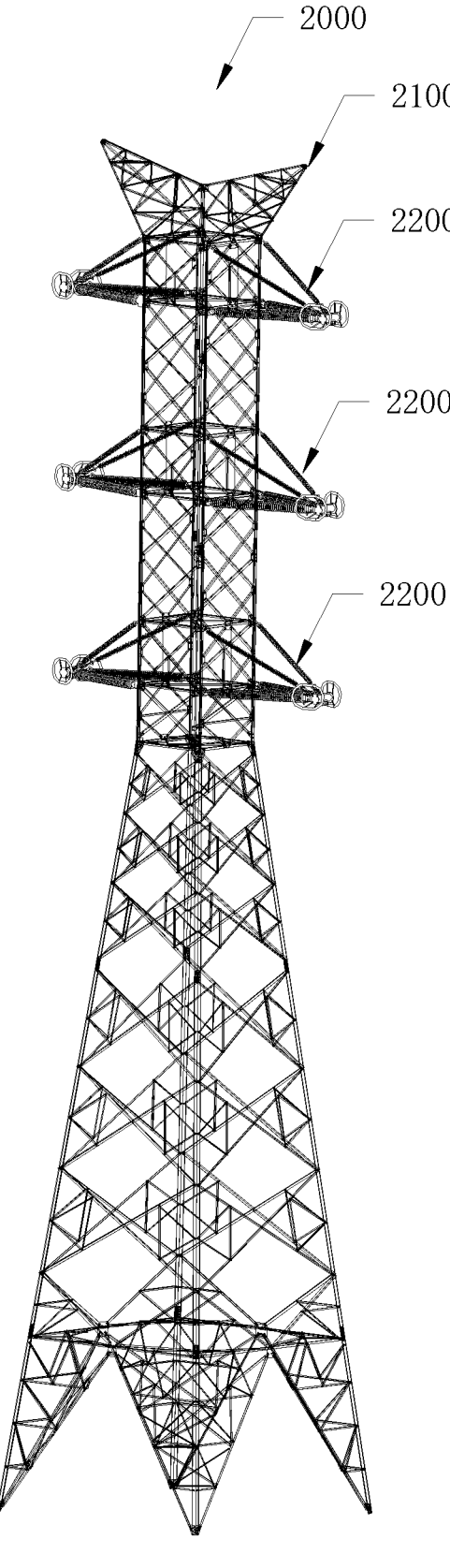
FIG. 14 is a schematic structural view of a power transmission tower according to one or more embodiments.

Referring to FIG. 14, in an embodiment, the power transmission tower 2000 includes a tower body 2500 and a composite crossarm 2200 connected to the tower body 2500. Three composite crossarms 2200 are sequentially arranged on the tower body 2500 from bottom to top, and the three composite crossarm 2200 have the same structure as the composite crossarm in any one of the above-mentioned embodiments. Reference may be made to the above embodiments for details, and which will not be repeated herein.

The above description only illustrates the embodiments of the present disclosure, and does not limit the patent scope of the present disclosure. Any equivalent structure or equivalent process conversion made by referring to the specification and drawings of the present disclosure, or directly or indirectly used in other related technical fields, are all included in the protection scope of this disclosure in the same way.

The invention claimed is:

1. A composite crossarm, comprising:
   at least one insulator; and
   at least one arcing device connected to the insulator, each of the at least one arcing device comprising a high-voltage end arcing component and a low-voltage end arcing component,
   wherein the high-voltage end arcing component is connected to a high-voltage end of the insulator, and the low-voltage end arcing component is connected to a low-voltage end of the insulator; and
   wherein the at least one arcing device comprises a first arcing device having an electrical clearance between the high-voltage end arcing component and the low-voltage end arcing component less than an electrical clearance between the high-voltage end and the low-voltage end of any one of the at least one insulator;
   wherein the high-voltage end arcing component includes an arcing ball and a first arcing rod;
   wherein a first end of the first arcing rod is connected to the insulator, and a second end of the first arcing rod is connected with the arcing ball; and wherein the arcing ball serves as an arcing end of the high-voltage end arcing component,
   the first end of the first arcing rod connected to the insulator is connected with a first groove fitting,
   a grading ring is sleeved on the high-voltage end of the insulator, and the grading ring is connected to the first groove fitting; the first groove fitting and the grading ring are spaced from each other in a first direction parallel to an extension direction of the insulator;
   wherein the grading ring is provided with a notch, wherein the second end of the first arcing rod is bent at the notch in a direction away from the grading ring and connected to the arcing ball.

2. The composite crossarm according to claim 1, wherein an insulator with a shed of a shortest length in the at least one insulator is connected with the first arcing device.

3. The composite crossarm according to claim 1, wherein the first arcing rod has a multi-section bending structure comprising a plurality of first arcing sections that are smoothly connected in sequence.

4. The composite crossarm according to claim 1, wherein the first groove fitting connects the first arcing rod to the insulator via a high-voltage end connecting fitting.

5. The composite crossarm according to claim 4, wherein the first groove fitting is provided with a first groove into which the high-voltage end connecting fitting is inserted; and wherein the first groove fitting is further provided with a first through hole through which a locking member extends, allowing for a connection of the high-voltage end connecting fitting to the first groove fitting.

6. The composite crossarm according to claim 4, wherein the grading ring is connected to the first groove fitting by a connecting bracket.

7. The composite crossarm according to claim 6, wherein the grading ring, the connecting bracket, the first arcing rod and the arcing ball are arranged to be symmetrical with respect to a first plane; and wherein the first groove fitting is arranged to be symmetrical with respect to a second plane perpendicular to the first plane, and an intersection line of the first plane and the second plane coincides with a central axis of the grading ring.

8. The composite crossarm according to claim 1, wherein the low-voltage end arcing component comprises a second arcing rod; and wherein an end of the second arcing rod is connected to the insulator, and another end of the second arcing rod serves as an arcing end of the low-voltage end arcing component.

9. The composite crossarm according to claim 8, wherein the second arcing rod has a multi-section bending structure comprising a plurality of second arcing sections that are smoothly connected in sequence.

10. The composite crossarm according to claim 9, wherein first and last second arcing sections of the plurality of second arcing sections are arranged at a certain angle with respect to each other.

11. The composite crossarm according to claim 8, wherein the end of the second arcing rod connected to the insulator is connected with a second groove fitting, and the second groove fitting is configured to connect the second arcing rod to the insulator.

12. The composite crossarm according to claim 1, further comprising: a high-voltage end connecting fitting comprising an end connected to the insulator and another end connected to a first connecting fitting; wherein the high-voltage end connecting fitting is further connected with the high-voltage end arcing component; wherein two ends of the high-voltage end connecting fitting are each provided with a second through hole through which a locking element extends, allowing for a connection of the end of the high-voltage end connecting fitting to the insulator and a connection of the another end of the high-voltage end connecting fitting to the first connecting fitting; and wherein extension directions of the second through holes provided at the two ends of the high-voltage end connecting fitting are different from each other.

13. The composite crossarm according to claim 12, wherein the high-voltage end connecting fitting comprises a first connecting plate and a first connecting lug connected to the first connecting plate; wherein the first connecting plate is provided with the second through hole so that the high-voltage end connecting fitting is capable of being connected to the first connecting fitting, and the first connecting lug is provided with the second through hole so that the high-voltage end connecting fitting is capable of being connected to the insulator; and wherein the first connecting plate is further provided with a third through hole so that the high-voltage end connecting fitting is capable of being connected to the high-voltage end arcing component.

14. The composite crossarm according to claim 1, further comprising: a low-voltage end connecting fitting, two ends of the low-voltage end connecting fitting being each provided with a fourth through hole through which a locking member extends, allowing for a connection of an end of the low-voltage end connecting fitting to the insulator and a connection of the another end of the low-voltage end connecting fitting to a second connecting fitting; and wherein extension directions of the fourth through holes provided at the two ends of the low-voltage end connecting fitting are the same as each other.

15. The composite crossarm according to claim 14, wherein the low-voltage end connecting fitting comprises a second connecting plate and a groove sub-fitting connected to the second connecting plate; wherein the second connecting plate is provided with the fourth through hole so that the low-voltage end connecting fitting is capable of being connected to the insulator, the groove sub-fitting is provided with the fourth through hole so that the low-voltage end connecting fitting is capable of being connected to the second connecting fitting; and wherein the second connecting plate is further provided with a fifth through hole so that the low-voltage end connecting fitting is capable of being connected to the low-voltage end arcing component.

16. The composite crossarm according to claim 1, wherein the at least one insulator comprises two post insulators and two suspension insulators; or the at least one insulator comprises one post insulator and three suspension insulators.

17. A power transmission tower, comprising:

a tower body; and the composite crossarm according to claim 1 connected to the tower body.

\* \* \* \* \*